(12) United States Patent
Borisov et al.

(10) Patent No.: US 9,699,216 B2
(45) Date of Patent: Jul. 4, 2017

(54) SYSTEM AND METHOD FOR REMOTELY MANAGING SECURITY AND CONFIGURATION OF COMPUTE DEVICES

(71) Applicant: JANUS TECHNOLOGIES, INC., Half Moon Bay, CA (US)

(72) Inventors: Mikhail Borisov, Cupertino, CA (US); Sofin Raskin, Los Altos, CA (US); Michael Wang, Taipei (TW); Joshua Porten, Austin, TX (US)

(73) Assignee: JANUS TECHNOLOGIES, INC., Half Moon Bay, CA (US)

( * ) Notice: Subject to any disclaimer, the term of this patent is extended or adjusted under 35 U.S.C. 154(b) by 0 days.

(21) Appl. No.: 14/967,201

(22) Filed: Dec. 11, 2015

(65) Prior Publication Data

US 2016/0099974 A1    Apr. 7, 2016

Related U.S. Application Data

(63) Continuation of application No. 13/971,711, filed on Aug. 20, 2013, now Pat. No. 9,215,250.

(51) Int. Cl.
*H04L 29/06* (2006.01)
*H04L 29/08* (2006.01)
*G06F 21/55* (2013.01)
*G06F 21/85* (2013.01)

(52) U.S. Cl.
CPC ............ *H04L 63/20* (2013.01); *G06F 21/552* (2013.01); *G06F 21/85* (2013.01); *H04L 63/10* (2013.01); *H04L 67/12* (2013.01); *H04L 67/125* (2013.01)

(58) Field of Classification Search
CPC ....................................................... H04L 63/20
See application file for complete search history.

(56) References Cited

U.S. PATENT DOCUMENTS

| 4,598,170 A | 7/1986 | Piosenka et al. |
|---|---|---|
| 5,191,542 A | 3/1993 | Murofushi |
| 5,724,027 A | 3/1998 | Shipman et al. |

(Continued)

FOREIGN PATENT DOCUMENTS

| EP | 2 407 905 | 1/2012 |
|---|---|---|
| EP | 2 517 144 | 10/2012 |
| KR | 10-2011-0034351 | 4/2011 |

OTHER PUBLICATIONS

International Preliminary Report on Patentability for International Patent Application No. PCT/US2014/051674, mailed on Mar. 3, 2016, 9 pages.

(Continued)

*Primary Examiner* — Dao Ho
(74) *Attorney, Agent, or Firm* — Foley & Lardner LLP; Mark J. Danielson

(57) ABSTRACT

The present invention relates to a system that manages security of one or more computer systems and/or one or more different types of I/O channels such as USB, Ethernet, SATA, and SAS. According to certain aspects, the management system is distributed. That is, a central management system and computer subsystems are physically distributed within one or more geographical areas, and communicate with each other by passing messages through a computer network. According to certain additional aspects, the configuration and/or security functions performed by methods and apparatuses according to the invention can be logically transparent to the upstream host and to the downstream device.

20 Claims, 6 Drawing Sheets

(56) References Cited

U.S. PATENT DOCUMENTS

| | | | |
|---|---|---|---|
| 5,946,469 | A | 8/1999 | Chidester |
| 6,061,794 | A | 5/2000 | Angelo et al. |
| 6,088,802 | A | 7/2000 | Bialick et al. |
| 6,457,164 | B1 | 9/2002 | Hwang et al. |
| 6,507,914 | B1 | 1/2003 | Cain et al. |
| 6,546,491 | B1 | 4/2003 | Challener et al. |
| 6,594,780 | B1 | 7/2003 | Shen et al. |
| 6,725,438 | B2 | 4/2004 | Van Ginneken |
| 6,782,424 | B2 | 8/2004 | Yodaiken |
| 6,820,160 | B1 | 11/2004 | Allman |
| 6,922,817 | B2 | 7/2005 | Bradfield et al. |
| 7,120,892 | B1 | 10/2006 | Knol et al. |
| 7,149,992 | B2 | 12/2006 | Chang et al. |
| 7,240,303 | B1 | 7/2007 | Schubert et al. |
| 7,320,071 | B1 | 1/2008 | Friedman et al. |
| 7,330,891 | B2 | 2/2008 | Yodaiken |
| 7,337,100 | B1 | 2/2008 | Hutton et al. |
| 7,340,700 | B2 | 3/2008 | Emerson et al. |
| 7,350,204 | B2 | 3/2008 | Lambert et al. |
| 7,380,126 | B2 | 5/2008 | Logan et al. |
| 7,396,257 | B2 | 7/2008 | Takahashi |
| 7,469,343 | B2 | 12/2008 | Ray et al. |
| 7,478,235 | B2 | 1/2009 | England et al. |
| 7,516,217 | B2 | 4/2009 | Yodaiken |
| 7,635,272 | B2 | 12/2009 | Poppe |
| 7,677,065 | B1 | 3/2010 | Miao |
| 7,962,755 | B2 | 6/2011 | Pizano et al. |
| 7,987,497 | B1 | 7/2011 | Giles et al. |
| 8,402,529 | B1 | 3/2013 | Green et al. |
| 8,429,419 | B2 | 4/2013 | Endrys |
| 8,566,934 | B2 | 10/2013 | Srivastava et al. |
| 8,606,971 | B2 | 12/2013 | Cain et al. |
| 8,627,106 | B2 | 1/2014 | Pizano et al. |
| 9,076,003 | B2 | 7/2015 | Raskin et al. |
| 2002/0007456 | A1 | 1/2002 | Peinado et al. |
| 2002/0069396 | A1 | 6/2002 | Bhattacharya et al. |
| 2004/0044891 | A1 | 3/2004 | Hanzlik et al. |
| 2004/0199879 | A1 | 10/2004 | Bradfield et al. |
| 2005/0240892 | A1 | 10/2005 | Broberg et al. |
| 2007/0255963 | A1 | 11/2007 | Pizano et al. |
| 2008/0091833 | A1 | 4/2008 | Pizano |
| 2008/0247540 | A1 | 10/2008 | Ahn et al. |
| 2008/0263658 | A1 | 10/2008 | Michael et al. |
| 2008/0276302 | A1 | 11/2008 | Touboul |
| 2009/0013111 | A1 | 1/2009 | Berland et al. |
| 2009/0033668 | A1 | 2/2009 | Pederson et al. |
| 2009/0212844 | A1 | 8/2009 | Darmawan et al. |
| 2009/0319782 | A1 | 12/2009 | Lee |
| 2010/0024004 | A1 | 1/2010 | Boegelund et al. |
| 2010/0180027 | A1 | 7/2010 | Drako |
| 2010/0192230 | A1 | 7/2010 | Steeves et al. |
| 2010/0201400 | A1 | 8/2010 | Nardone et al. |
| 2011/0102443 | A1 | 5/2011 | Dror et al. |
| 2011/0131423 | A1 | 6/2011 | Ponsini |
| 2011/0258460 | A1 | 10/2011 | Pizano et al. |
| 2012/0017197 | A1 | 1/2012 | Mehta |
| 2012/0192129 | A1 | 7/2012 | Bowers et al. |
| 2012/0216242 | A1 | 8/2012 | Uner et al. |
| 2012/0324067 | A1 | 12/2012 | Hari et al. |
| 2013/0067534 | A1 | 3/2013 | Soffer |
| 2013/0212671 | A1 | 8/2013 | Wang et al. |
| 2013/0238908 | A1 | 9/2013 | Pizano |
| 2014/0248039 | A1 | 9/2014 | Porten et al. |
| 2015/0058442 | A1 | 2/2015 | Raskin et al. |
| 2015/0058587 | A1 | 2/2015 | Wang et al. |
| 2015/0058912 | A1 | 2/2015 | Raskin et al. |
| 2015/0058970 | A1 | 2/2015 | Raskin et al. |
| 2015/0058975 | A1 | 2/2015 | Raskin et al. |

OTHER PUBLICATIONS

Garfinkel (2003), "Terra: A Virtual Machine-Based Platform for Trusted Computing", ACM SOSP. Proc. of the ACM Symp. on Operating System Principles, Oct. 22, 2003, pp. 193-206.

International Search Report and Written Opinion issued Nov. 24, 2014 in corresponding PCT/US2014/051674.

Landau et al. (2011), "SlitX: Split Guest/Hypervisor Execution on Multi-Core", 3rd Workshop of IO Virtualization, Jun. 14, 2011, pp. 1-7.

US Final Office Action for U.S. Appl. No. 13/971,711, mailed Jul. 7, 2015.

US Non-Final Office Action for U.S. Appl. No. 13/971,711, mailed Jan. 15, 2015.

US Notice of Allowance for U.S. Appl. No. 13/971,711, mailed Sep. 23, 2015.

SYSTEM AND METHOD FOR REMOTELY MANAGING SECURITY AND CONFIGURATION OF COMPUTE DEVICES

CROSS-REFERENCE TO RELATED APPLICATIONS

The present application is a continuation of U.S. application Ser. No. 13/971,711 filed Aug. 20, 2013, now U.S. Pat. No. 9,215,250, the contents of which are incorporated herein by reference in their entirety.

FIELD OF THE INVENTION

The present invention relates to a system that manages security and/or configuration of one or more computer systems and/or different types of interfaces thereof.

BACKGROUND OF THE INVENTION

Conventional computing devices typically include one to many conventional types of input/output (I/O) ports for communicating with connectable external devices such as mice, keyboards, wireless modems, etc. Such computing devices further include one or more internal connections between a host processor (e.g. CPU) with internal devices such as storage devices (e.g. SATA/SAS drives). In conventional devices, these internal and external communications are rarely secured.

With respect to I/O ports, for example, Universal Serial Bus (USB) is a standard communication protocol between a host computer and peripheral devices. However, USB does not provide any level of security for the data transmitted from the peripheral devices to the host system. This poses a huge risk for enterprises, and more particularly, IT administrators who are responsible for securing their IT systems and devices.

USB is inherently not secure for several reasons. One reason is that USB data is sent in plain text. The data can be captured and analyzed by any USB protocol analyzer or software application. Another reason is that any USB peripheral is capable of connecting to a host computer since USB specification doesn't provide any means to filter unwanted or potentially harmful devices.

Relatedly, when confronted with many different types of internal and external interfaces and computing devices, managing the security of communications among all of them can be a challenge.

SUMMARY OF THE INVENTION

The present invention relates to a system that manages configuration and/or security of one or more computer systems and/or one or more different types of internal and external interfaces such as USB, Ethernet, SATA, and SAS. According to certain aspects, the management system is distributed. That is, a central management system and computer subsystems are physically distributed within one or more geographical areas, and communicate with each other by passing messages through a computer network. According to certain additional aspects, the configuration and/or security functions performed by methods and apparatuses according to the invention can be logically transparent to the upstream host and to the downstream device.

In accordance with these and other aspects, a system for managing security of one or more computers, includes a remote management system that manages security policies, secure subsystems incorporated in the one or more computers, and a communication channel between the remote management system and the secure subsystems, wherein the remote management system selectively sends certain of the security policies to the secure subsystems via the communication channel, and wherein the secure subsystems are configured to enforce the security policies in the incorporated computers.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE PREFERRED EMBODIMENTS

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

In general, embodiments of the invention include a system that manages security and/or configuration of one or more computer systems and/or one or more different types of internal/external interfaces such as USB, Ethernet, SATA, and SAS. According to certain aspects, embodiments of a management system according to the invention are distributed. That is, a central management system and managed computer subsystems are physically distributed within one or more geographical areas, and communicate with each other by passing messages through a network. According to one aspect, embodiments of a system according to the invention are capable of implementing various types and levels of security protections and system configurations in accordance with policies. According to certain additional aspects, the security and configuration functions performed by methods and apparatuses according to the invention can be logically transparent both to the managed host and to connected device(s).

Figure 1:
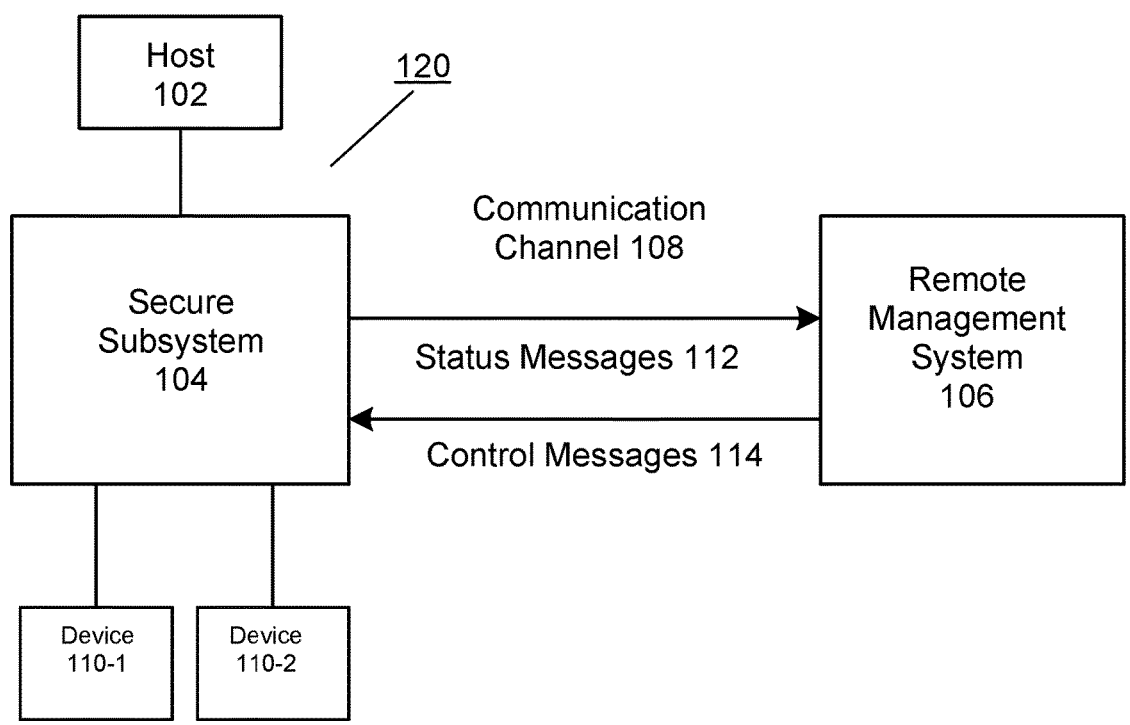
FIG. 1 is a block diagram illustrating an example system for managing configuration and security of a secure computer according to embodiments of the invention.

FIG. 1 is a system level block diagram of a management system 100 according to embodiments of the invention. As shown, system 100 includes a managed secure computer 120 comprising a Host 102, Secure Subsystem 104, and two directly (internally and/or externally) attached devices 110-1 and 110-2.

There are many possible configurations of system 100, host 102, subsystem 104 and attached devices 110 that all fall within the scope of the invention, and the present invention is not limited to any particular configuration. In one non-limiting example configuration, secure computer 120 is a standalone computer system, similar to a conventional desktop, laptop or pad computer. In such an example, host 102 is implemented by a CPU (e.g. x86), a conventional operating system such as Windows, associated device driver software and interface hosts such as SATA hosts and USB hosts. In accordance with certain aspects of the invention, in this example, the operation and functionality of subsystem 104 is completely transparent to the host 102 and associated operating system and application software. Moreover, the operating experience of secure computer 120 by a user is identical to the experience of a conventional desktop, laptop or pad computer, apart from the security functionality of the present invention. So while the application software that can run on the computer is virtually unrestricted, use of devices 110 is strictly controlled by subsystem 106 which enforces security policies as will be described in more detail below.

In these and other embodiments, subsystem 104 is preferably an embedded system. As such, it runs a designated software system furnished together with an embedded processor, and can not be modified by the end-user of the computer under any circumstances. An example architecture for implementing subsystem 104 together with host 102 is described in co-pending application Ser. No. 13/971,677, the contents of which are incorporated by reference herein. Those skilled in the art will understand how to implement the principles of the present invention in various configurations of secure computer 120 after being taught by the present disclosure.

Devices 110 can include peripheral devices such as keyboards, mice, touchpads, touchscreens, printers, etc. that use interfaces such as USB, HDMI, etc. The number and type of peripherals can depend on the particular form factor of secure computer 120. For example, in embodiments of the invention where the form factor is that of a conventional desktop computer, the peripherals can include a keyboard and a mouse, which are externally attached. Where the form factor is that of a conventional notebook computer, the peripherals can include an integrated keyboard and touchpad. Where the form factor of computer 120 is that of a tablet computer or smart phone, the peripherals can include an integrated touchscreen. It should be noted that peripherals between different types of form factors for secure computer 120 are not necessarily mutually exclusive, nor are they constant over time. For example, many conventional touchpad computer systems may be operated with optional separate keyboards and mice (e.g. connected through USB or Bluetooth). Likewise, many conventional desktop computer systems may be operated with optional touchscreens or voice-command devices.

Devices 110 can also include internal and external storage devices such as disk drives, thumb drives, memory cards, etc. Devices 110 can also include network access interfaces such as Ethernet, Firewire, etc.

FIG. 1 further shows a Remote Management system 106 coupled to secure subsystem 104 of secure computer 120 by a communication channel 108. FIG. 1 also shows the different message types that can be sent over a Communication Channel 108, specifically status messages 112 from secure subsystem 104 to remote management system 106, and control messages 114 from remote management system 106 to secure subsystem 104.

Although FIG. 1 shows remote management system 106 coupled to only one secure subsystem 104, it should be apparent that one or more additional secure subsystems 104 may be similarly coupled to remote management system 106.

Channel 108 can be implemented in various ways, possibly depending on the number and type of devices to be managed by system 106. Channel 108 can be a separate direct point-to-point link between system 106 and subsystem 104. In other embodiments, channel 108 can be implemented by a transmission medium that is shared between many subsystems 104. In these and other embodiments, the medium can be any combination of wired or wireless media, such as Ethernet or Wireless LAN. In these and other embodiments, channel 108 can be implemented by various types and/or combinations of public and private networks.

Control messages 114 sent from Remote Management System 106 to one or more Secure I/O Subsystems 104 contain different configuration commands and settings to be described in more detail below. Status messages 112 sent from one or more Secure I/O Subsystems 104 to Remote Management System 106 contain different notifications and alerts. There can be additional types of messages exchanged between Remote Management System 106 and Secure I/O Subsystem 104, for example data messages. In embodiments, all data exchanged between subsystem 104 and system 106 is encrypted, for example by using secure VPN.

Figure 2:
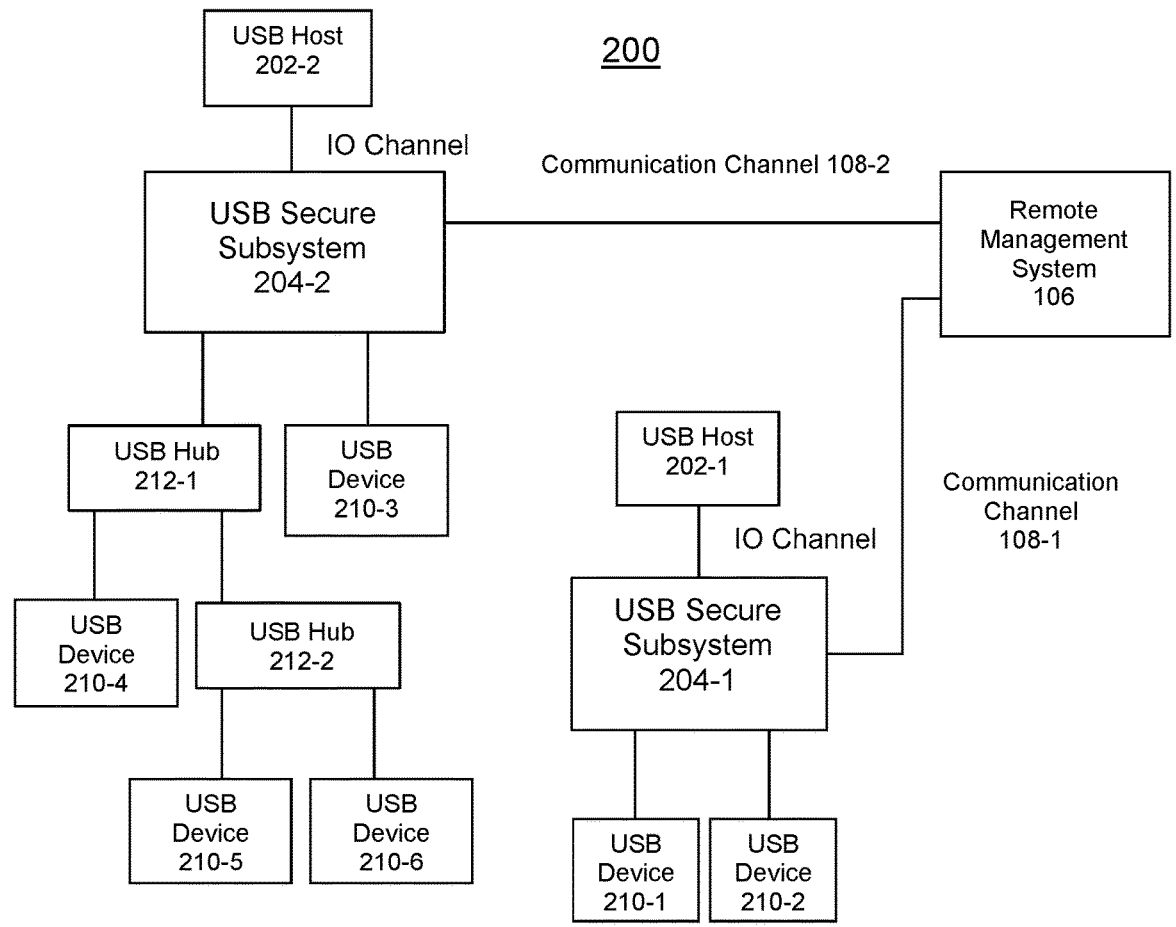
FIG. 2 is a block diagram illustrating another example system for managing I/O communications in two or more secure computers according to embodiments of the invention.

FIG. 2 is a block diagram illustrating another example management system 200 according to embodiments of the invention. In this example, the system manages security of I/O communications and the example type of I/O is USB. As shown in this example, the system includes two USB secure subsystems 204-1 and 204-2 connected to Remote Management System 106 via respective communication channels 108-1 and 108-2.

As is known, USB allows a more complex topology, and this diagram illustrates how the invention can be applied to this and other types of I/O with such topologies. For example, as shown in FIG. 2, remote management system 106 manages secure USB communications for two USB Hosts 202-1 and 202-2, two USB Hubs 212-1 and 212-2, and six USB devices 210-1 to 210-6 connected either directly to the Secure USB Subsystems 204-1 and 204-2 or via USB Hubs 212-1 and 212-2. As described above, USB Host 202-1 or 202-2 can be included in a variety of computing devices including, but not limited to a server, a PC, or an embedded device such as secure computer 120.

Example aspects of securing I/O communications such as USB in a computer system that can be adapted for use in the present invention are described in more detail in co-pending application Ser. No. 13/971,582, the contents of which are incorporated by reference herein in their entirety.

Figure 3:
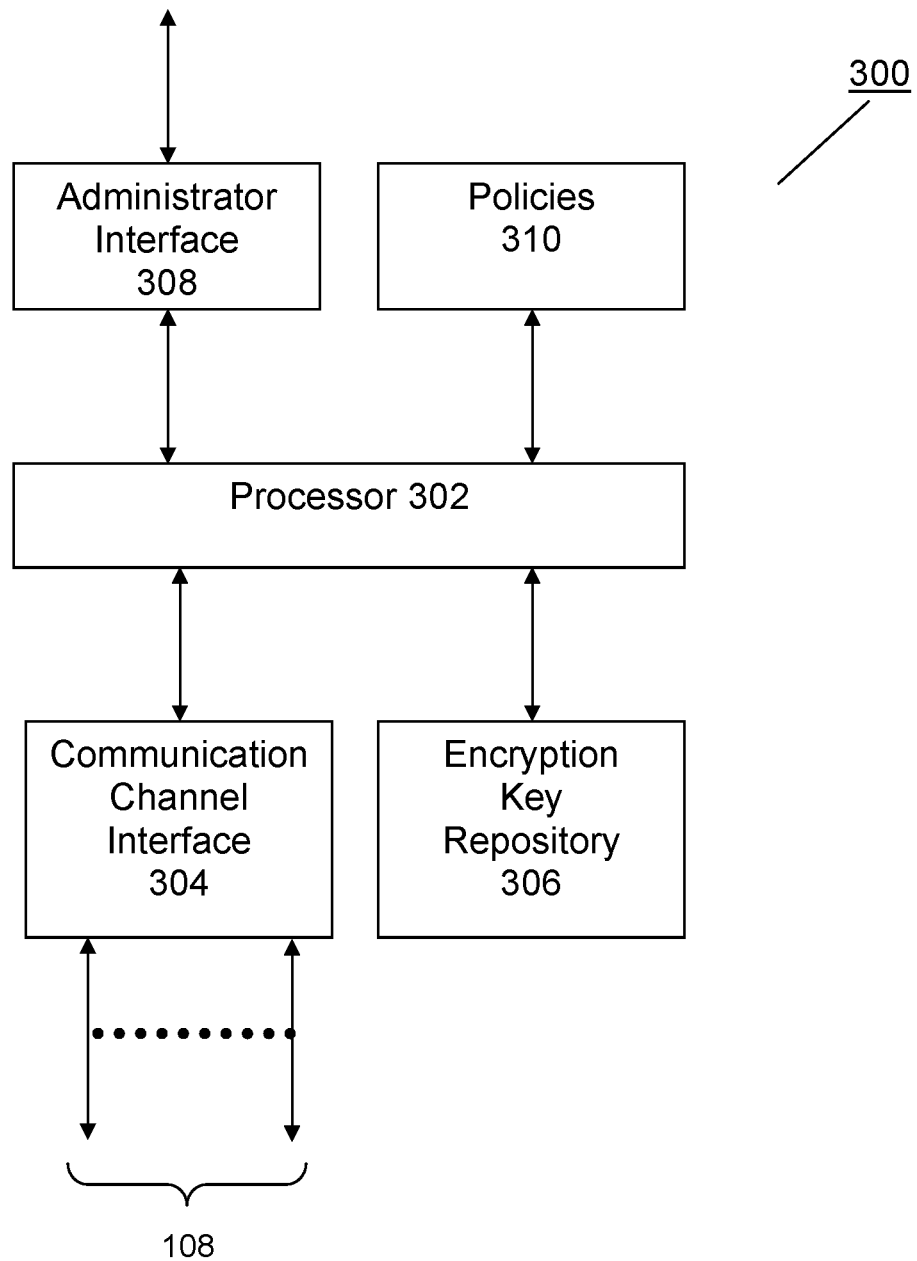
FIG. 3 is a block diagram illustrating an example remote management system according to embodiments of the invention.

FIG. 3 is a block diagram illustrating an example implementation of a Remote Management System 106 according to embodiments of the invention. In the example of FIG. 3, Remote Management System 106 includes a Processor 302, a Communication Channel Interface 304, an Encryption Key Repository 306, and Administrator Interface 308 and Policies 310.

Processor 302 can include any suitable type of CPU or processor (e.g. x86, etc.) executing any suitable type of operating system (e.g. Unix, Linux, Windows, etc.) and/or application software. Such application software can implement and/or include functionality to manage elements 304, 306, 308 and 310, as will become more apparent to those skilled in the art after being taught by the present disclosure.

Communication channel interface 304 is responsible for exchanging messages and/or data between system 106 and subsystem(s) 104 via communication channel(s) 108. The implementation details of interface 304 can depend on the type of communications used on channel 108. In one possible implementation, communication channel interface 304 includes an Ethernet interface and uses secure data protocols such as VPN.

Administrator interface 308 provides an interactive user interface that allows an administrator to configure policies 310 and keys 306 and/or receive alerts regarding communications with managed I/O devices. Example aspects of such interface functionalities will become apparent from the descriptions of managing policies, keys and alerts as described herein.

Encryption key repository 306 includes encryption keys for use in encrypting and decrypting communications for I/O devices that have been configured for encrypted communications. Key repository 306 can be implemented with a database-type organization such that the keys can be accessed, changed and/or deleted. For example, keys can be assigned by an IT Manager or other type of system administrator, using the administrator interface 308. They can be associated with particular devices associated with subsystems 104, with specific functions (e.g. VPN, etc . . . ), or with specific types of devices (e.g. a USB flash drive, a HDD/SSD, etc . . . ). Example aspects of encryption keys and their use in embodiments of the invention are described in more detail in U.S. Pat. No. 9,076,003, the contents of which are incorporated by reference herein in their entirety.

Policies 310 define operational aspects of how devices associated with subsystem(s) 104 are configured, including policies for secure communications. The number and type of policies 310 managed by system 106 depend on the number and types of device configurations and communication security functions that are desired for a particular implementation of secure system 100. These can include any number and combination of configurations and security functions described in co-pending applications Ser. Nos. 13/971,582, 13/971,604, 13/971,732, 13/971,651, and 13/971,692, and U.S. Pat. No. 9,076,003, the contents of each of which are incorporated by reference herein in their entireties. Those skilled in the art will be able to implement policies 310 for any such number of configurations and security functions after being taught by the present disclosure and the co-pending applications.

For example, and as described more fully in the co-pending applications, policies 310 can include security actions such as whether to block communications to a device (i.e. gatekeeping), encrypt communications to/from a device, snoop, capture and/or analyze communications to detect certain types of traffic, and/or to fully allow communications without any interruption. The identification of devices can be any level of specificity. For example, whole classes of devices such as mice or keyboards can be identified as not requiring any security. Likewise, an entire class of device such as a thumb drive can be identified as requiring encryption. The identification can be more specific, for example by device vendor and product ID or device unique serial number. Still further, gatekeeping may also be determined based on the contents of an attached (e.g. USB mass storage) device and/or may completely block access to certain defined types of devices (e.g. USB thumb drive).

In connection with snooping, capturing and/or analyzing communications, policies 310 can include a list of pre-defined keywords to detect. Additionally and relatedly, policies 310 can include situations when an alert is generated. For example, an alert may be issued when a device attempts to connect, if a user's authentication is rejected and/or accepted, if certain memory areas are accessed at all or too many times, if certain Ethernet packet header information is detected, if certain online addresses are accessed, etc.

Other types of device configurations and/or security functions that can be managed using policies 310 include the following. Policies 310 can define if and how to use watermarking of video and/or audio data. Policies 310 can define internal storage backup policies, including when, what data to backup or perform snapshots and how (e.g. whether or not to use encryption or compression). Policies 310 can specify whether or not to allow USB keyboard and mouse emulation. Policies 310 can define VPN configurations for use in managing network access and communications by managed devices. Policies 310 can define data integrity functions such as background backup (e.g. snapshots), security scanning of a device's hard disk, hard disk compression and/or compression of certain types of data on a disk. Policies 310 can also include device configurations for performing audio mixing, video blending, resizing and repositioning of windows, etc.

Policies 310 can also be organized among users and/or devices in various ways. For example, system 300 may be configured to manage devices as groups with similar or related configuration properties and security associations (e.g. members of a company, or a finance group within a company). Likewise certain types of devices may have their own security attributes (e.g. a key for a USB memory device) and may be shared (i.e. granted access to) by a pre-defined group of members. For example, a given sales team may be allowed to share a specific USB memory stick that would contain sensitive customer files. In a similar fashion, particular managed devices may also have their own secure ID that can be established through an authentication process.

Additional aspects of policies 310 and how they are managed and used according to embodiments of the invention will become more apparent from the descriptions below.

Figure 4:
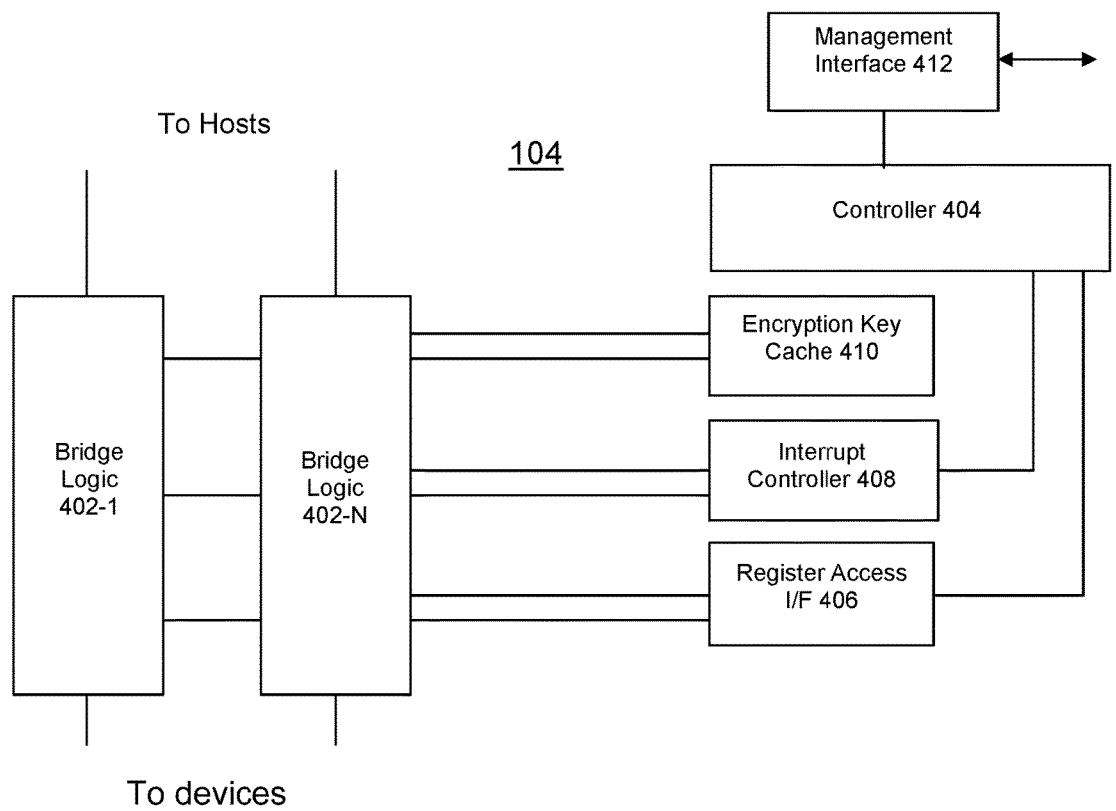
FIG. 4 is a block diagram illustrating an example secure USB subsystem according to embodiments of the invention.

For example, FIG. 4 is a block diagram illustrating an example implementation of causing a Secure Subsystem 104 to enforce an encryption policy in a secure computer 120 managed by remote management system 106 according to embodiments of the invention.

As shown, example subsystem 104 includes one or more instances of the Bridge Logic 402, a controller 404 for controlling overall operations of subsystem 104, a register access interface 406 for allowing logic 402 to access registers from the controller, an interrupt controller 408 for allowing logic 402 to provide asynchronous notifications to controller 404, an Encryption Key Cache 410 that stores encryption keys used for encrypting communications between computer Hosts and Devices (e.g. SATA, USB, etc.), and a management interface 412 for allowing communications between subsystem 104 and management system 106 over channel 108.

In embodiments, bridge logic 402 is responsible for performing data encryption and decryption according to configuration policies. In embodiments, each instance of Bridge Logic 402 is located on the data path of a specific I/O channel. The particular connectivity of the Bridge Logic within the channel depends on the I/O channel type. For example, for USB bridge logic 402 is connected to a USB Host on an upstream port and a USB device or hub on a downstream port.

For example, when an administrator wishes to cause certain types of USB communications to be encrypted (e.g. communications with all attached USB thumb drives), system 106 configures its policies and keys appropriately and communicates the configuration and necessary key(s) to subsystem 104 via management interface 412. Thereafter, whenever the particular device is attached (e.g. when a USB thumb drive is plugged into a USB port), this is detected by the associated bridge logic 402-1 to 402-N. Controller 404 and logic 402 cooperate to configure the channel for encryption using the appropriate key stored in cache 410. For all subsequent communications between the USB device and host, USB packet contents are encrypted and decrypted, transparently to both the USB device and host.

The embodiment of FIG. 4 depicts blocks that are common to different types of I/O channels such as USB, Ethernet, SAS, and SATA. One implementation of the example subsystem 102 shown in FIG. 4 for securing SATA communications is further described in co-pending U.S. application Ser. No. 13/971,732 and further aspects of encryption and decryption that can be used in accordance with the invention are described in U.S. Pat. No. 9,076,003. Those skilled in the art will understand how to adapt the secure USB subsystem described in those applications for other types of communications and configurations for use with the management system 106 of the present invention after being taught by the present disclosure.

Figure 5:
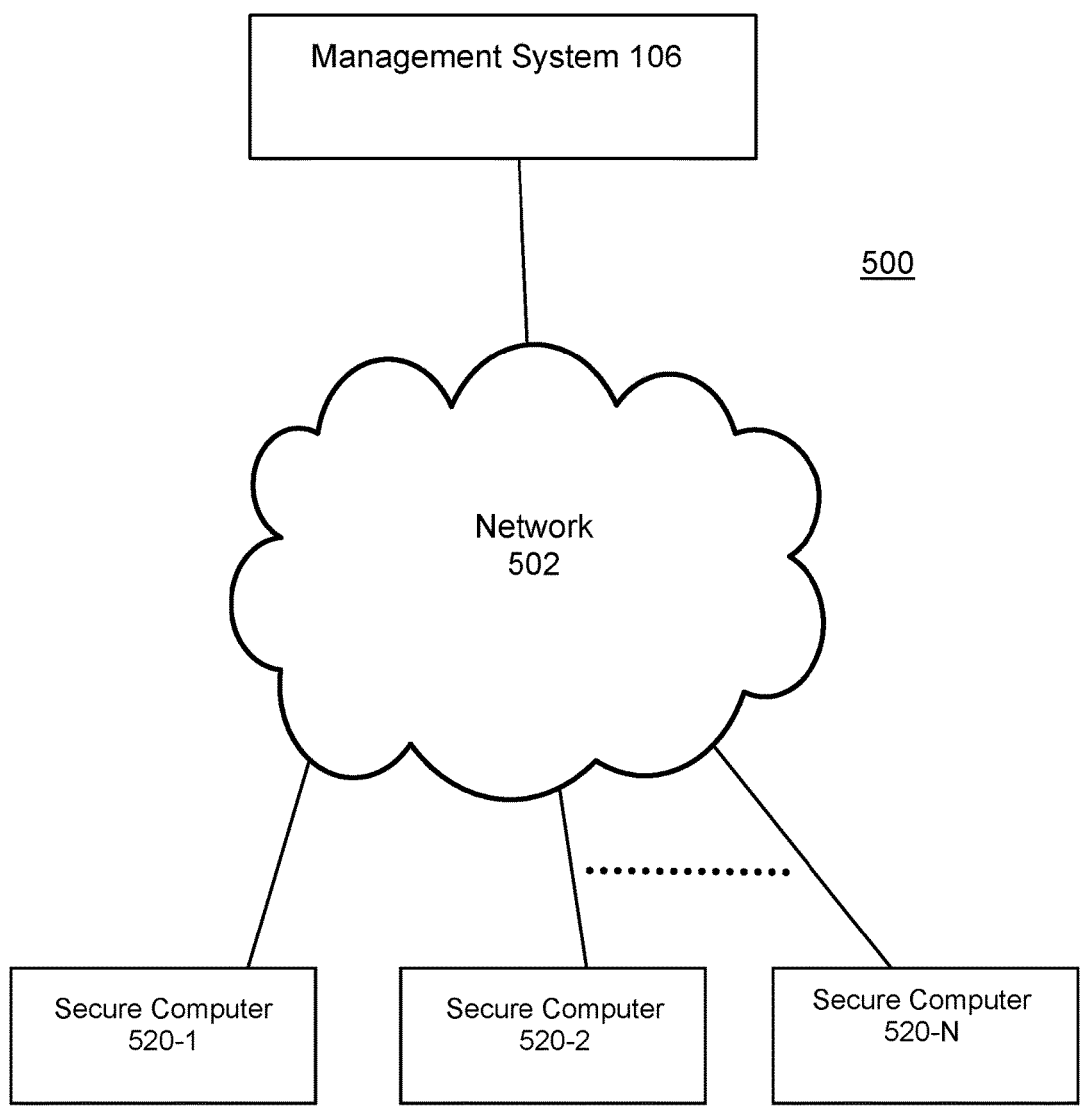
FIG. 5 is a block diagram of an overall system for managing security and configuration of secure computers in a network according to embodiments of the invention.

FIG. 5 is a diagram illustrating an example overall communications management system according to embodiments of the invention.

As shown, the system consists of a single remote management system 106 connected to multiple secure computers 520-1 to 520-N over a communication network 502, by which channels 108 are implemented in this example. In embodiments, the communication network 502 can include any combination of private and public networks. As set forth above, secure computers 520 can comprise secure subsystems 104 included in a variety of computing devices such as, but not limited to a desktop or laptop PC, or an embedded device.

FIG. 5 illustrates a preferred embodiment where the management system according to the invention is distributed. That is, a central management system and the managed secure computers are physically distributed within one or more geographical areas, and communicate with each other by passing messages through network 502. The number of managed systems and their locations, as well as the particular type(s) of networks used can depend on any given organization or application. For example, with large organizations, network 502 can include the Internet and many different geographical locations. For smaller organizations, network 502 can be only a single LAN, for example within a single office building. Those skilled in the art will appreciate various alternative implementations after being taught by these examples.

Figure 6:
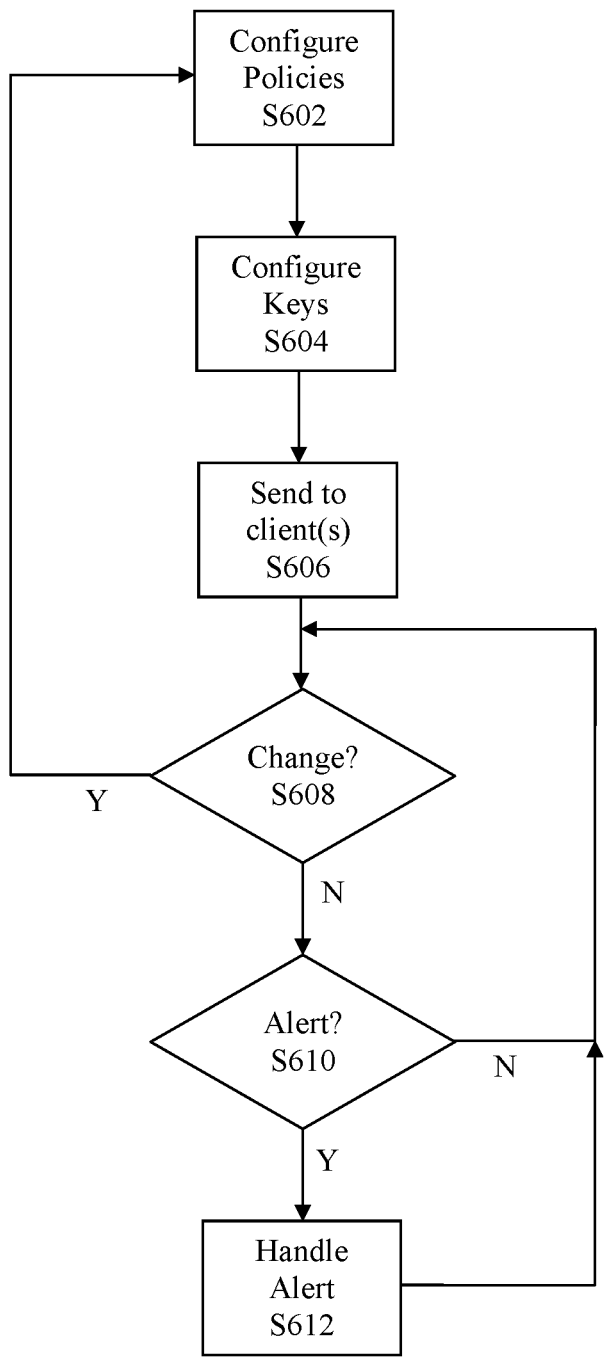
FIG. 6 is a flowchart illustrating an example methodology for managing secure computer configuration and security according to embodiments of the invention.

FIG. 6 is a flowchart illustrating an example methodology performed by management system 106 for managing security of I/O channels according to embodiments of the invention.

In step S602, policies 310 are configured. This can include adding new policies, deleting policies, and changing policies. In embodiments, such additions, deletions and changes are performed by an administrator interacting with a user interface that presents fields for different types of I/O channels and different security options. In other embodiments, policies are downloaded from an external source (e.g. using scripts or files).

As described in more detail above, policies can be any variation between broad and specific. For example, policies can be configured that apply to an entire I/O type, to a device class, to a device vendor, to a specific product ID, unique device serial numbers, etc. As further set forth previously, policies can include any of a variety of actions to be taken such as limiting the devices that are allowed to be connected to the host (e.g. gatekeeping by device class), performing encryption, snooping, etc. Accordingly, the complexity and variety of actions in step S602 can depend on the configuration and security options available in the policies for any given application.

In step S604, (optional in some embodiments) keys in repository 308 are configured. This can include adding new keys, deleting keys, and changing keys. Similar to policies, keys can be configured either using an administrator interface or by downloading from an external source. As described above, for example, keys can be assigned by an IT Manager, using an administrator interface. They can be associated with specific managed devices, with specific functions (e.g. VPN, etc.), or with specific types of devices (e.g. a USB flash drive, a HDD/SSD, etc).

In step S606, the configured policies and (optionally) keys are sent to secure computers 520. In embodiments, policies and keys are sent to all subsystems, and the subsystems themselves are responsible for implementing the policies, such as using keys when encryption is required for a particular type of I/O or attached device. In other embodiments, one or both of policies and keys are maintained only by the system 106, and system 106 communicates keys and policies to secure subsystems only on an as-needed basis, such as when a new I/O device is connected to a system managed by a secure subsystem, or when a host device (e.g. PC) associated with a secure subsystem "boots" (i.e., wakes up). In these and other embodiments, when the host device shuts down (or after a pre-defined period) the keys can be deleted. In still further embodiments, policies and (optionally) keys are always sent from management system 106 to all secure computers 520 before their Hosts boot. The secure subsystems parse those policies and act accordingly. If there is no connection to system 106 during Host boot, the secure subsystems use existing/default policies.

It should be apparent that other security actions can be taken when a device managed by the system boots or seeks network access. For example, the system can interact with secure computers 520 to first establish a VPN connection with the remote management system 506 and only thereafter access an overall network.

In step S608, it is determined whether any new changes are needed to policies and/or keys. If so, processing returns to step S602. For example, an administrator can periodically update policies while computers are being operated, and these changes can be pushed immediately to all operating computers.

In step S610, it is determined whether any alert from a client has been received. If so, the alert is handled in step S612. In either event, processing returns to step S608 to determine whether a change is needed.

An alert can be generated, for example, when a device has been configured for traffic snooping and a violation of a policy has been detected by a secure computer 520. As described above, a violation can be the occurrence of any number or combination of pre-defined keywords in snooped traffic. Other types of alerts can be generated automatically such as periodic status notifications from secure subsystems (e.g. heartbeat).

In embodiments, the handling of an alert can include generating an audible and/or visual signal for an administrator. Handling an alert can also include updating a policy, applying a new or changed policy to an affected device, directly accessing the managed device, etc.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. A system comprising:
   a server computer;
   a plurality of secure computers; and
   a communication channel between the server computer and the plurality of secure computers,
   wherein the server computer includes:
      a storage for a plurality of security policies;
      an administrator interface for allowing an administrator to configure a first one of the security policies for a first one of the plurality of secure computers and to configure a second one of the security policies for a second one of the plurality of secure computers, wherein the first and second security policies respectively define different first and second prohibited operations to be performed by the first and second secure computers; and
      a communication channel interface for managing communications between the server computer and the plurality of secure computers over the communication channel, wherein the server computer is adapted to send the first and second ones of the security policies to the first and second secure computers, respectively, via the communication channel using the communication channel interface, and
      wherein the server computer is further adapted to receive alerts from the first and second secure computers via the communication channel using the communication channel interface, and
      wherein the alerts are related to attempts to perform the first and second prohibited operations,
   and wherein each of the plurality of secure computers include:
      a host processor;
      a device interface;
      an upstream port for communicating with the host processor; a downstream port for communicating with a device via the device interface; and a secure subsystem interposed between the upstream port and the downstream port, such that the host processor and the device are incapable of communicating independently with each other without the secure subsystem, and such that the secure subsystem is operative thereby to enforce the sent one of the security policies, and wherein the server computer is further adapted to:
      determine whether a change is needed in one of the first and second security policies, wherein the change is not in response to one of the alerts being received, and,
      when the change is needed, send the changed one of the first and second security policies to one of the first and second secure computers via the communication channel using the communication channel interface, and
      when the change is not needed, further determine whether one of the alerts has been received.

2. A system according to claim 1, wherein the prohibited first and second operations comprise connection of different first and second unauthorized devices to the first and second secure computers, respectively.

3. A system according to claim 2, wherein the first and second unauthorized devices comprise specific I/O devices.

4. A system according to claim 3, wherein the specific I/O devices comprise specific device classes of universal serial bus (USB) devices.

5. A system according to claim 1, wherein the prohibited first and second operations comprise different first and second keywords used by the first and second secure computers, respectively.

6. A system according to claim 5, wherein the prohibited first and second operations comprise network communications performed by the first and second secure computers, respectively.

7. A system according to claim 5, wherein the prohibited first and second operations comprise communications with connected I/O devices performed by the first and second secure computers, respectively.

8. A system according to claim 5, wherein the first and second keywords comprise network addresses used in network communications performed by the first and second secure computers, respectively.

9. A system according to claim 1, wherein the first and second secure computers are associated with different first and second different groups of employees in an organization.

10. A system according to claim 1, wherein the change is needed in response to a command from the administrator interface.

11. A method comprising:
   maintaining a plurality of security policies in a management server;
   allowing an administrator to configure a first one of the security policies for a first one of a plurality of secure computers and to configure a second one of the security policies for a second one of the plurality of secure computers, wherein the first and second security policies respectively define different first and second prohibited operations to be performed by the first and second secure computers;

managing communications between the management server and the plurality of secure computers over a communication channel, the communications including sending the first and second ones of the security policies to the first and second secure computers, respectively, via the communication channel by the management server, and the communications further including receiving alerts from the first and second secure computers via the communication channel at the management server, wherein the alerts are related to attempts to perform the first and second prohibited operations;

interposing, in each of the secure computers, a secure subsystem between an upstream port for communicating with a host processor and a downstream port for communicating with a device via a device interface, such that the host processor and the device are incapable of communicating independently with each other without the secure subsystem;

enforcing, by the secure subsystems, the security policies in the secure computers;

determining, by the management server, whether a change is needed in one of the first and second security policies, wherein the change is not in response to one of the alerts being received, and, when the change is needed, sending the changed one of the first and second security policies to one of the first and second secure computers via the communication channel by the management server, and when the change is not needed, further determining by the management server whether one of the alerts has been received.

12. A method according to claim 11, wherein the prohibited first and second operations comprise connection of different first and second unauthorized devices to the first and second secure computers, respectively.

13. A method according to claim 12, wherein the first and second unauthorized devices comprise specific I/O devices.

14. A method according to claim 12, wherein the specific I/O devices comprise specific device classes of universal serial bus (USB) devices.

15. A method according to claim 11, wherein the prohibited first and second operations comprise different first and second keywords used by the first and second secure computers, respectively.

16. A method according to claim 15, wherein the prohibited first and second operations comprise network communications performed by the first and second secure computers, respectively.

17. A method according to claim 15, wherein the prohibited first and second operations comprise communications with connected I/O devices performed by the first and second secure computers, respectively.

18. A method according to claim 15, wherein the first and second keywords comprise network addresses used in network communications performed by the first and second secure computers, respectively.

19. A method according to claim 11, wherein the first and second secure computers are associated with different first and second different groups of employees in an organization.

20. A method according to claim 11, wherein the change is needed in response to a command from the administrator interface.

* * * * *

UNITED STATES PATENT AND TRADEMARK OFFICE
CERTIFICATE OF CORRECTION

PATENT NO. : 9,699,216 B2
APPLICATION NO. : 14/967201
DATED : July 4, 2017
INVENTOR(S) : Borisov et al.

Page 1 of 1

It is certified that error appears in the above-identified patent and that said Letters Patent is hereby corrected as shown below:

In the Claims

In Column 9, Line 65, in Claim 1, delete "operations," and insert -- operations, and --, therefor.

In Column 9, Line 66, in Claim 1, delete "and wherein" and insert -- wherein --, therefor.

In Column 12, Line 7, in Claim 14, delete "claim 12," and insert -- claim 13, --, therefor.

Signed and Sealed this
Twenty-third Day of January, 2018

Joseph Matal
*Performing the Functions and Duties of the
Under Secretary of Commerce for Intellectual Property and
Director of the United States Patent and Trademark Office*